Figure 1:
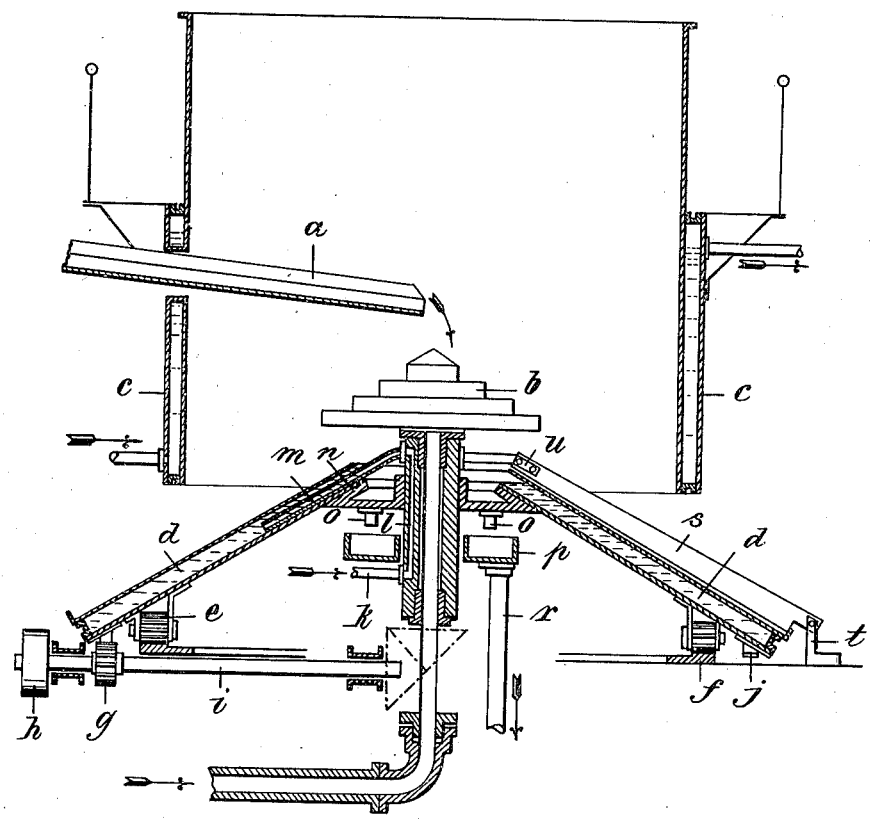

No. 757,035. PATENTED APR. 12, 1904.
C. GRAMM.
APPARATUS FOR THE MANUFACTURE OF SLAG CEMENT.
APPLICATION FILED MAR. 5, 1902.
NO MODEL.
2 SHEETS—SHEET 1.

WITNESSES:

INVENTOR
CARL GRAMM
BY
ATTORNEYS

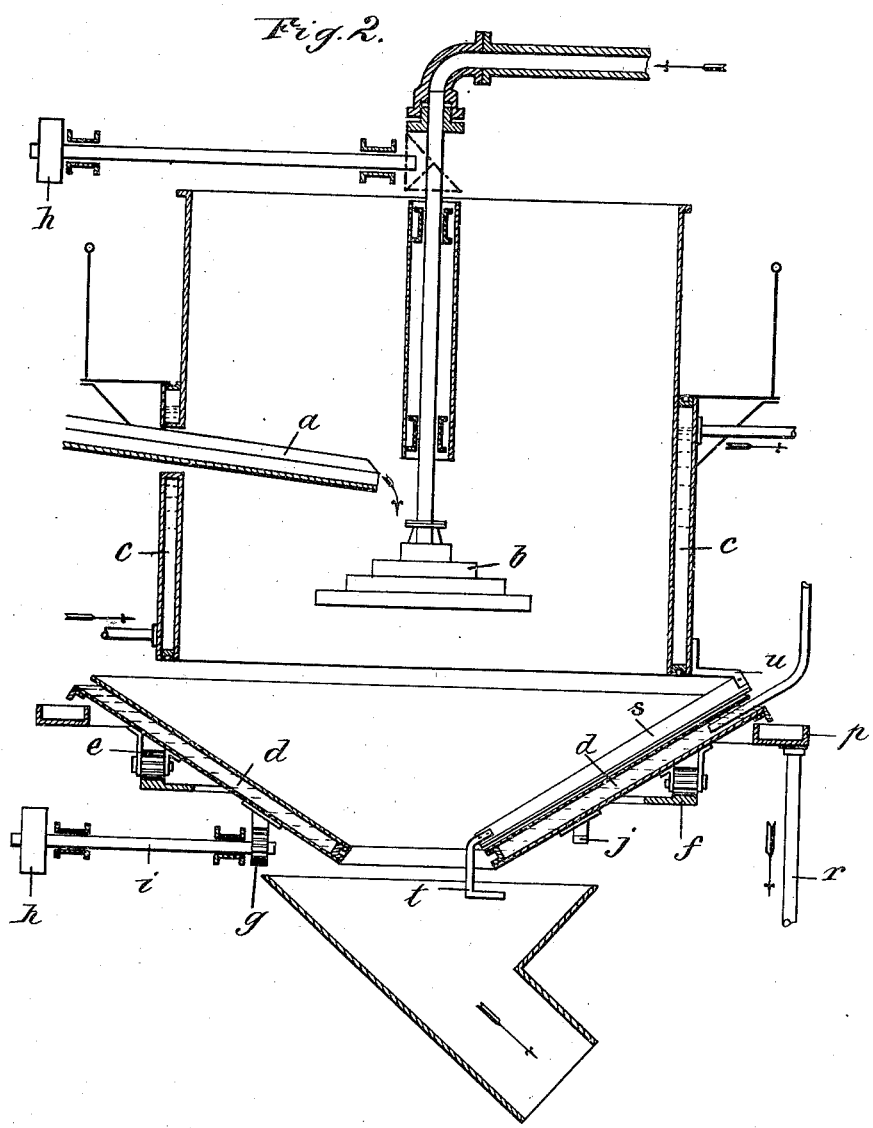

No. 757,035. Patented April 12, 1904.

UNITED STATES PATENT OFFICE.

CARL GRAMM, OF FRANKFORT-ON-THE-MAIN, GERMANY, ASSIGNOR, BY MESNE ASSIGNMENTS, TO HENRY EDMUNDS, OF LONDON.

APPARATUS FOR THE MANUFACTURE OF SLAG CEMENT.

SPECIFICATION forming part of Letters Patent No. 757,035, dated April 12, 1904.

Application filed March 5, 1902. Serial No. 96,762. (No model.)

*To all whom it may concern:*

Be it known that I, CARL GRAMM, a subject of the German Emperor, residing at Frankfort-on-the-Main, Germany, have invented certain new and useful Improvements in Apparatus for the Manufacture of Slag Cement, of which the following is a specification, taken in connection with the accompanying drawings, which form a part of the same.

This invention relates to apparatus for the manufacture of slag cement, and relates especially to apparatus for disintegrating highly-heated or molten blast-furnace slag and for converting the same into a highly-cementitious material.

This invention relates to improvements on the apparatus described in United States Letters Patent to Fellner, No. 687,524, granted November 26, 1901.

Now the present invention has for its object to provide means whereby to scrape off and discharge laterally the finely-divided material which has fallen upon a flat or conical table situated below the distributing-cone. To this end the table is mounted to rotate upon rollers, and close above it is fixed in a radial or oblique position a stationary scraper which sweeps over the surface of the table while the latter revolves, whereby the finely-divided material distributed over the table is removed therefrom.

Reference is to be had to the accompanying drawings, in which—

Figure 1 is a central sectional elevation of one form of my invention, and Fig. 2 is a like view of another form.

$a$ is the inflow-chute of the slag.

$b$ is the rotary distributing-cone, which is situated below the inflow $a$ and is preferably made of stepped form.

$c$ is the water-jacketed casing surrounding the cone $b$, a cold-water circulation being maintained through the jacket. Below the distributing-cone $b$ is mounted a double-walled water-cooled table $d$, whereof the surface may be horizontal or conical, as shown in the drawings. The table $d$ rotates on rollers $e$, running on a circular race $f$. The table carries a ring of teeth $j$, with which gears a toothed wheel $g$ on a shaft $i$, provided with a belt-pulley $h$ for the purpose of driving the table.

The cooling-water for the table enters at $k$, flows through the passage $l$, and passes through the fixed pipe $m$ into the space between the two walls of the table. The heated water, on the contrary, overflows into the basin $n$ and passes thence through the short pipes $o$ into the catch-basin $p$, whence it escapes through the pipe $r$.

The finely-divided slag, which falls from the distributing-cone $b$ down upon the table $d$, which is cooled in the manner stated, requires to be diverted to a definite spot in the outer periphery of the table. For this purpose there is provided at that spot a scraper $s$ in the form of a blade, supported at $t$ and $u$ close above the upper surface of the table $d$. When the surface of the table is flat, the said blade is preferably set obliquely to the radius; but when the table is made conical, as shown, the blade is preferably arranged radially thereto.

When a conical table $d$ is used, it is preferably so arranged as to project upward some distance within the casing $c$, which surrounds the distributing-cone $b$. It will be seen that the distributing-cone $b$ and the table $d$ rotate in the same direction, but at a different angular speed, the distributing-cone making a plurality of revolutions to one revolution of the table.

Fig. 2 shows an alternative form of the table, wherein the slag is discharged by a central aperture of a conical table slanting toward its center.

It is of course apparent that modifications may be made by those familiar with this art in the form, proportions, and numbers of parts of this apparatus without departing from the spirit of this invention or losing the advantages of the same. I do not, therefore, desire to be limited to the details of the disclosure which has been made in this case; but

What I claim as new, and what I desire to secure by Letters Patent, is set forth in the appended claims:

1. The combination of a rotary distributer, means for conveying material to said distributer, and a rotary table located below the distributer and arranged to receive the material therefrom.

2. The combination of a rotary distributer, means for conveying material thereto, a rotary table located below the distributer and arranged to receive the material therefrom, and a stationary scraper adjacent to the table.

3. The combination of a rotary distributer, means for conveying material thereto, a rotary table arranged to receive the material from the distributer, and means for imparting different rotary movements to the table and to the distributer.

4. The combination of a rotary distributer, means for conveying the material thereto, and a conical rotary table located below the distributer and arranged to receive the material therefrom.

5. The combination of a stationary casing, a rotary distributer within the casing, and a rotary table located exteriorly of the casing and arranged to receive the material from the distributer.

In testimony whereof I have signed my name to this specification in the presence of two subscribing witnesses.

CARL GRAMM.

Witnesses:
  JEAN GRUND,
  CARL GRUND.